US009026771B2

(12) United States Patent
Ibrahim et al.

(10) Patent No.: US 9,026,771 B2
(45) Date of Patent: May 5, 2015

(54) SECURE COMPUTER SYSTEM UPDATE

(75) Inventors: Wael Ibrahim, Houston, TX (US);
Manuel Novoa, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2440 days.

(21) Appl. No.: 11/796,165

(22) Filed: Apr. 27, 2007

(65) Prior Publication Data
US 2008/0270781 A1 Oct. 30, 2008

(51) Int. Cl.
G06F 9/24 (2006.01)
G06F 15/177 (2006.01)
G06F 21/57 (2013.01)
G06F 21/10 (2013.01)
H04L 29/06 (2006.01)
H04L 9/08 (2006.01)
G06F 21/00 (2013.01)

(52) U.S. Cl.
CPC .............. G06F 21/57 (2013.01); *G06F 21/10* (2013.01); *H04L 63/062* (2013.01); *H04L 9/0891* (2013.01); *G06F 21/00* (2013.01)

(58) Field of Classification Search
CPC ........... G06F 8/65; G06F 21/00; G06F 21/10; G06F 21/57; H04L 9/0891; H04L 63/062
USPC ................... 713/1, 2, 100; 709/219, 220, 225
See application file for complete search history.

(56) References Cited

U.S. PATENT DOCUMENTS

| 7,506,380 B2 * | 3/2009 | Hunter et al. ................... 726/26 |
| 2006/0161784 A1 * | 7/2006 | Hunter et al. .................. 713/182 |
| 2007/0136577 A1 * | 6/2007 | Bade et al. ..................... 713/164 |
| 2008/0059799 A1 * | 3/2008 | Scarlata ........................ 713/176 |

* cited by examiner

*Primary Examiner* — Michael J Brown
(74) *Attorney, Agent, or Firm* — Caven & Aghevli LLC

(57) ABSTRACT

In one embodiment a computer system, comprises a processor, a trusted platform module comprising at least one platform configuration register, a basic input/output system, and logic to unseal at least one current key in the trusted platform module, initiate an update to the basic input/output system, obtain, with the update, at least a component of one expected value for a platform configuration register in the trusted platform module, seal at least one key using the at least one expected value for a platform configuration register, and install the basic input/output system update.

20 Claims, 3 Drawing Sheets

SECURE COMPUTER SYSTEM UPDATE

BACKGROUND

Computer security, and particularly the security of data which resides on a computer system, remains an important aspect of computing. In this regard, recent computer architectures have implemented security features designed to preclude, or at least to inhibit, unauthorized users of the computer systems from accessing data that resides on a computer's storage media. For example, recent trusted personal computer architectures incorporate a trusted platform module (TPM) that offers various services useful for data protection.

Some operating systems have been adapted to utilize the services of a TPM to implement data protection schemes. For example, the Vista operating system available from Microsoft Corporation of Redmond, Wash., USA utilizes the TPM to protect the encryption key that is used to encrypt data stored on the computer's hard drive, a feature referred to as "Bit Locker" encryption. The Linux operating system includes a feature referred to as "the enforcer," which uses the TPM to store the secret to an encrypted loopback file system.

At times it may be necessary to update the computer system's firmware, like the basic input/output system (BIOS), or the user may add an option card into a system which contains an option ROM component. In some circumstances, the above changes will result in changed PCR (Platform Configurations Register) values stored within the TPM upon next platform restart. This may prevent platform software subsequent to BIOS from decrypting previously encrypted data. This interference can render the data on the drive inaccessible to an authorized user of the system or may force the operating system to enter into recovery mode, where the user has to go through a series of inconvenient steps to allow the computer to start. These steps may include prompting the user to present an authentication token or a backup key stored on removable media. One procedure to update the firmware requires disabling Bit Locker, then updating the firmware and then re-enabling Bit Locker again. This exposes a window of vulnerability during the time Bit Locker is disabled.

DETAILED DESCRIPTION

Figure 1:
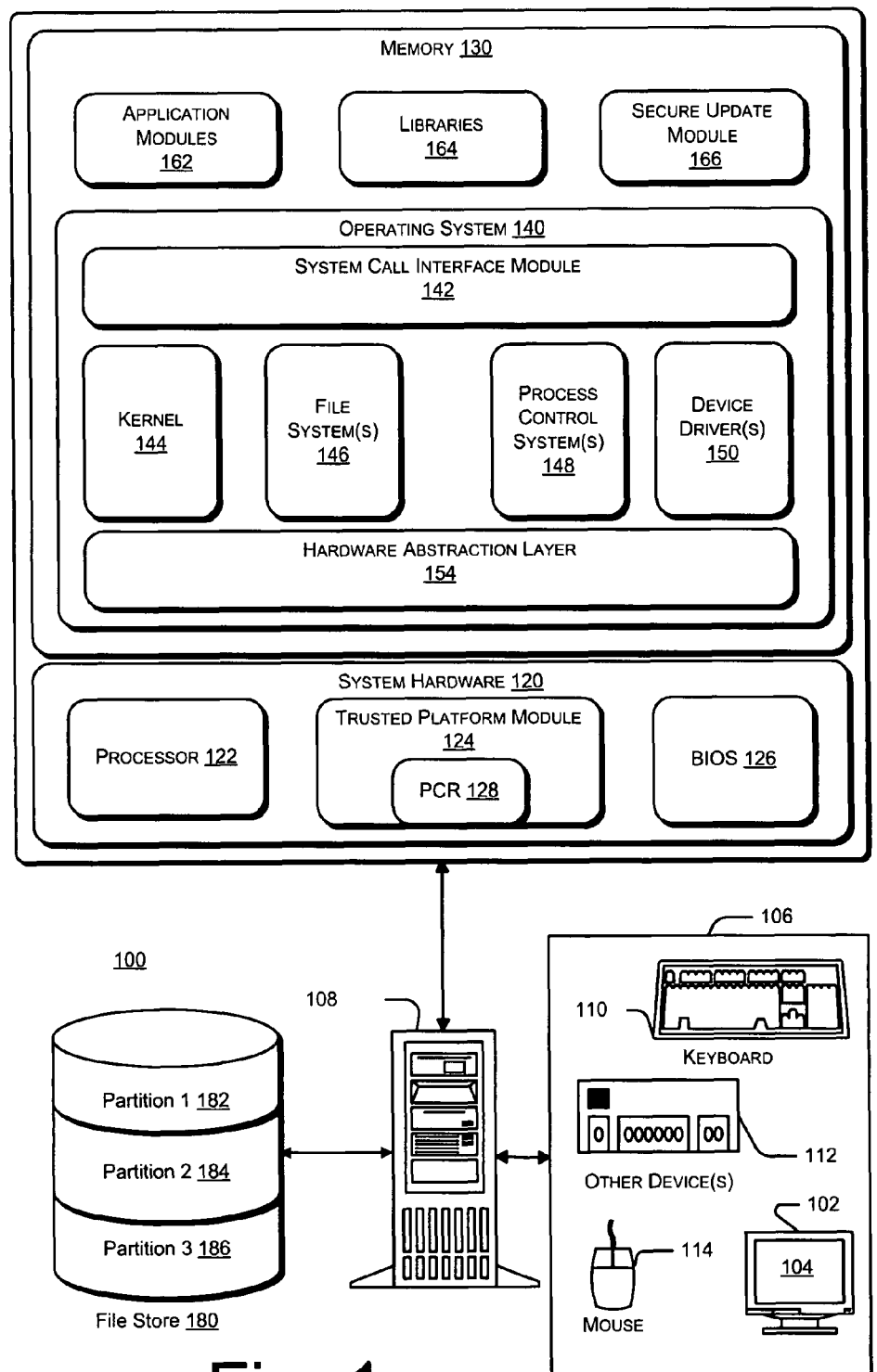
FIG. 1 is a schematic illustration of one embodiment of a computer system adapted to implement secure computer system update.

FIG. 1 is a schematic illustration of a computing system 100 adapted to implement a secure computer system update. In the illustrated embodiment, system 100 may be embodied as a hand-held or stationary device for accessing the Internet, a desktop PC, notebook computer, personal digital assistant, or any other processing devices that have a basic input/output system (BIOS), Startup Firmware, or equivalent.

The computing system 100 includes a computing engine 108 and one or more accompanying input/output devices 106 including a display 102 having a screen 104, a keyboard 110, other I/O device(s) 112, and a mouse 114. The other device(s) 112 may, for example, include a touch screen, a voice-activated input device, a track ball, and any other device that allows the system 100 to receive input from a developer and/or a user.

The computing engine 108 includes system hardware 120 commonly implemented on a motherboard and at least one auxiliary circuit board. System hardware 120 includes a processor 122 and a basic input/output system (BIOS) 126. BIOS 126 may be implemented in flash memory and may comprise logic operations to boot the computer device and a power-on self-test (POST) module for performing system initialization and tests. In operation, when activation of computing system 100 begins processor 122 accesses BIOS 126 and shadows the instructions of BIOS 126, such as power-on self-test module, into operating memory. Processor 122 then executes power-on self-test operations to implement POST processing.

Computer system 100 further includes a file store 180 communicatively connected to computing engine 108. File store 180 may be internal such as, e.g., one or more hard drives, or external such as, e.g., one or more external hard drives, network attached storage, or a separate storage network. In some embodiments, the file store 180 may include one or more partitions 182, 184, 186.

Memory 130 includes an operating system 140 for managing operations of computing engine 108. In one embodiment, operating system 140 includes a hardware abstraction layer 154 that provides an interface to system hardware 120. In addition, operating system 140 includes a kernel 144, one or more file systems 146 that manage files used in the operation of computing engine 108 and a process control subsystem 148 that manages processes executing on computing engine 108. Operating system 140 further includes one or more device drivers 150 and a system call interface module 142 that provides an interface between the operating system 140 and one or more application modules 162 and/or libraries 164. The various device drivers 150 interface with and generally control the hardware installed in the computing system 100.

In operation, one or more application modules 162 and/or libraries 164 executing on computing engine 108 make calls to the system call interface module 142 to execute one or more commands on the computer's processor. The system call interface module 142 invokes the services of the file systems 146 to manage the files required by the command(s) and the process control subsystem 148 to manage the process required by the command(s). The file system(s) 146 and the process control subsystem 148, in turn, invoke the services of the hardware abstraction layer 154 to interface with the system hardware 120. The operating system kernel 144 can be generally considered as one or more software modules that are responsible for performing many operating system functions.

The particular embodiment of operating system 140 is not critical to the subject matter described herein. Operating system 140 may, for example, be embodied as a UNIX operating system or any derivative thereof (e.g., Linux, Solaris, etc.) or as a Windows® brand operating system or another operating system.

In some embodiments, system hardware 120 may further include a trusted platform module (TPM) 124, which may be used to establish a trusted computing relationship between computer system 100 and at least one other computer system. TPM 124 may be embodied as an application specific integrated circuit (ASIC). Alternatively, TPM 124 may be embodied as logic instructions encoded in a programmable controller, e.g., a field programmable gate array (FPGA). In some embodiments the functions of TPM 124 may be embodied as logic instructions stored in a computer-readable medium and executable on a general purpose processor, e.g., software.

TPM 124 provides a number of services that may be used to authenticate a hardware device. For example, TPM 124 provide a random number generator service to generate cryptographic keys, a service to limit the use of cryptographic keys to specific functions such as, e.g., signing, verifying or encrypting and/or decrypting data. TPM 124 may further provide encryption services referred to as sealing. Sealing refers to an encryption service in which data is encrypted on a computer in such a way that it requires platform to be in a specific state (as provided by TPM PCR registers) in order to decrypt the data at a later time.

TPM 124 may include one or more platform configuration registers (PCRs) 128, which may be implemented in non-volatile random access memory (NVRAM) on the TPM 124. PCRs 128 may be used to store values representative of the platform configuration and state about the computer system 100. For example, when the computer system invokes encryption services provided by the TPM, the PCRs may be used to store result(s) of one or more transforms of various platform configurations such as a cryptographic hash of data from the BIOS, boot block, etc. In some embodiments, a computer system which uses the services of the TPM may use a state of various PCRs to encrypt and decrypt data on the file store 180. For example, if an owner or administrator of a computer system updates the BIOS (or the boot block, or other data used to generate the data in the values in the PCR) the update may render the data on the drive inaccessible. This situation may be avoided by turning off the encryption capabilities of the computer system, but this leaves a security hole in the system. The operating system seals the decryption key to a set of PCR values. For example, the OS may choose to seal to PCR0, PCR1, PCR2, PCR4 and PCR5. Each of these PCRs holds the measurement of an area of the system defined by the TCG PC Client specification. For example, PCR4 holds the measurement of the MBR (Master Boot Record) code and PCR5 holds the measurement of MBR data. PCR0 holds the hash of certain regions of the BIOS. When a BIOS update takes place, at least one of these PCR values will change. When that happens, the Boot Loader (or the initial stages of the boot process) will not be able to unseal the decryption key because it was sealed to a PCR value that has changed.

To address this and other issues, computer system 100 includes at least one secure update module 166, which may comprise operational logic and may include or invoke hardware that can communicate with at least one remote device. In the embodiment depicted in FIG. 1, a secure update module 166 resides in the memory 130 of computer system 100. In alternate embodiments the secure update module 166 may reside elsewhere such as, e.g., in a non-volatile memory module which contains BIOS 126. Operations implemented by the secure update module 166 will be discussed in greater detail below, with reference to FIGS. 2-4. For convenience and clarity, the update process will be described herein with reference to a BIOS update. However, the process is not limited to BIOS updates, and may be applied to updates of other components on the computer system 100.

Figure 2:
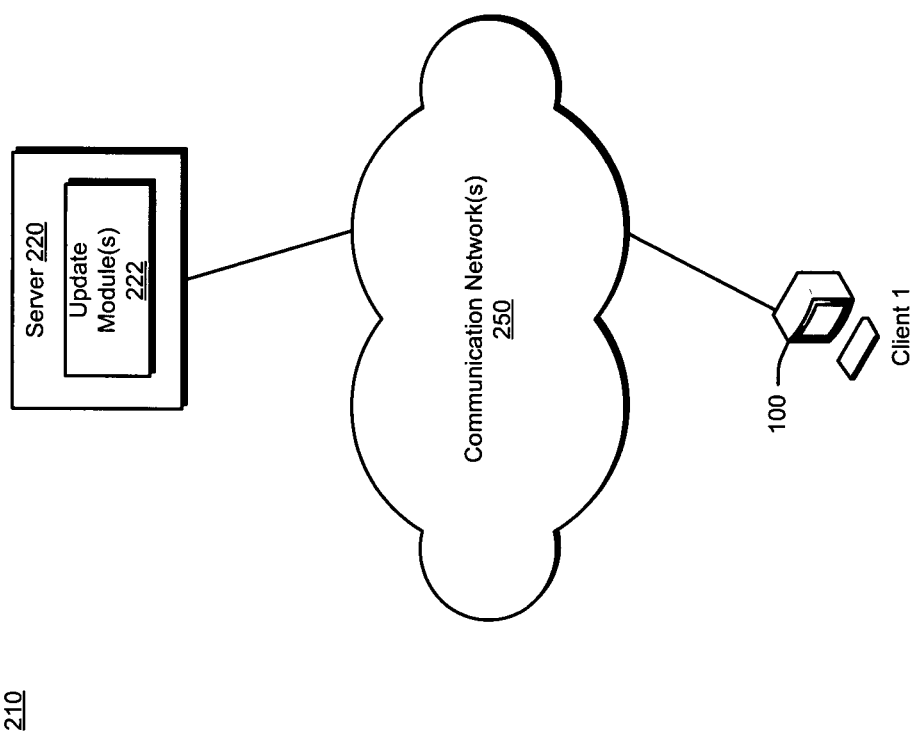
FIG. 2 is a schematic illustration of one embodiment of a networked computing environment in which a secure computer system update may be implemented.

In some embodiments a BIOS update may be initiated remotely via a communication network. FIG. 2 is a schematic illustration of one embodiment of a networked computing environment 210 in which a secure computer update may be implemented. The networked computing environment 210 is intended to illustrate a conventional client-server network configuration, and may represent a computing environment that spans a corporate or college campus, a city, or an entire geographic region.

In the computing environment 210 computer system 100 is communicatively coupled to at least one server 220 via at least one communication network 250. In the embodiment depicted in FIG. 2, server 220 comprises an update module 222, which includes one or more updates for computer system 100 and facilitates the update process. In some embodiments server 220 and update module 222 may be operated by a manufacturer of computer system 100. Operation of the update module 222 is described in greater detail below.

Communication network 250 may be implemented as a Local Area Network (LAN), Metropolitan Area Network (MAN) or a Wide Area Network (WAN) or the like. Further, communication network 250 may comprise one or more sub-networks. For example, communication network 250 may comprise one or more wireless access points (WAPs) that establish a wireless network, which is coupled to a LAN or directly to a backbone network such as the Internet.

Figure 3:
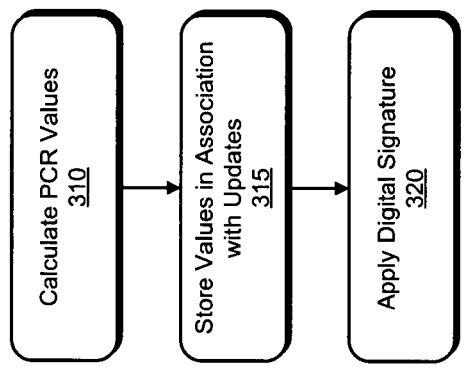
FIGS. 3-4 are flowcharts illustrating operations in one embodiment of implementing a secure computer system update.
Figure 4:
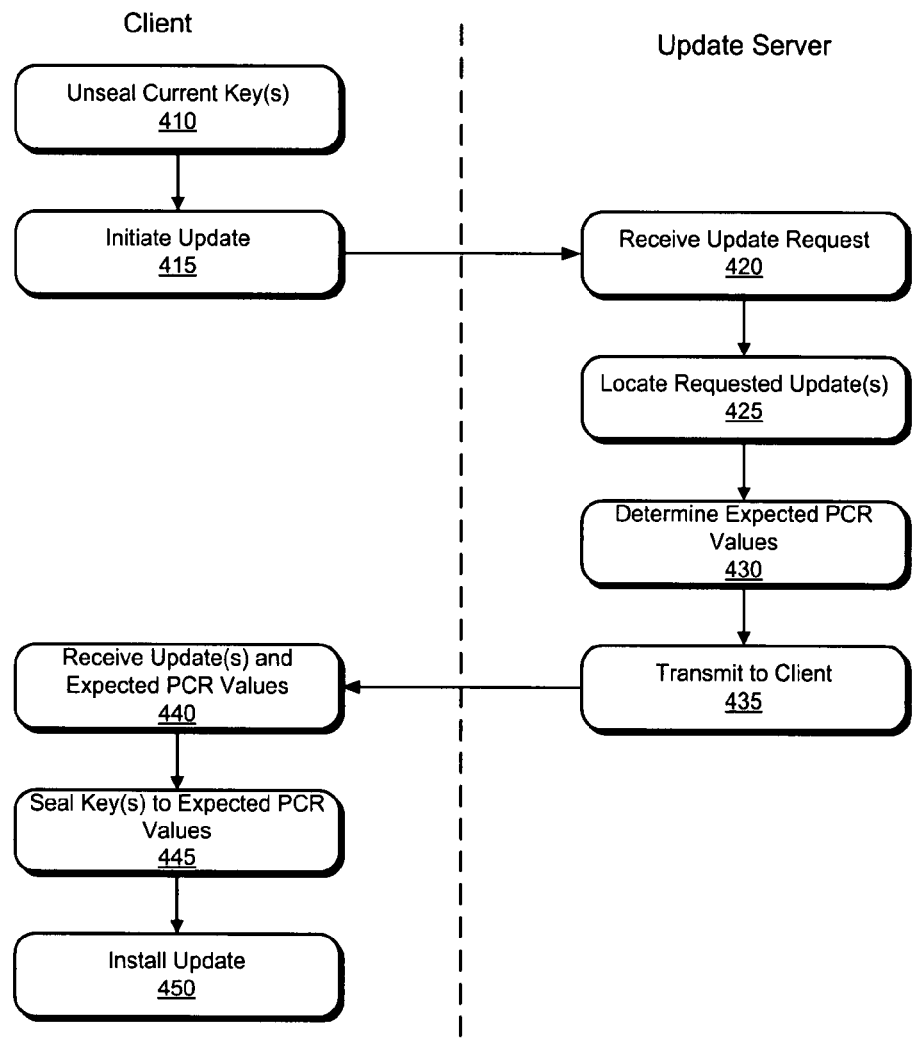

FIGS. 3-4 are flowcharts illustrating operations in one embodiment of implementing a secure computer system update. In some embodiments, the updated module(s) 222, 232, 242 of the respective servers 220, 230, 240 comprises an update for the BIOS, boot block, or other component of a computer system 100. Referring to FIG. 3, at operation 310 the update module(s) 222, 232, 242 calculate one or more hash values to be given to the operating system so that the operating system can reseal the decryption keys to these new PCR values. These values are representative of the new values that will be stored in the appropriate PCR upon subsequent reboots of a computer system 100 following the update. In some embodiments this calculation may require communication with the computer system 100. For example, the update module 222 may receive from the computer system 100 an identifier of the BIOS 126 in computer system via the communication network 250. The update module 222 may retrieve from memory BIOS code corresponding to the BIOS 126 of the computer system 100 and may determine a hash function of the retrieved BIOS code and code for a BIOS update.

At operation 315 the PCR values calculated in operation 310 are stored in association with the update(s) managed by update module 222. For example, the new PCR values may be stored in a manifest associated with a BIOS update file. Alternatively, the PCR values may be stored in the same file as the BIOS update. At operation 320 a digital signature may be applied to the file, e.g., for authentication purposes. Some PCR values are dependant on hardware configuration. As such these values are not predictable at the BIOS image build time. To help determine the values of such PCRs (for example PCR2 that holds composite hash of all Option ROMs) another application (or the OS) can calculate the future value with help from information that was saved in a manifest file at the BIOS image build time.

In some embodiments PCRs 0-7 contain hashes measured by BIOS. These may be composite hashes, in which an item is hashed and extended into a PCR. In some embodiments, the extend operation takes an existing value of PCR (which may be zero) at boot time and hashes the current PCR value with a hash to be added to PCR). For PCR's in which the BIOS contains all the components to be hashed into a composite value, a future value of a PCR value may be pre-calculated. In the example described above the expected values for PCR0 can be provided either in a manifest or a signed BIOS image.

By contrast, for PCR2 a platform or BIOS manufacturer's BIOS image may include option ROMs as part of the system BIOS (e.g., for embedded graphics controllers and NICs). New values may be calculated for option ROMs internal to the BIOS. For option ROMS as a result of a user upgrade (i.e., a graphics card or NIC that has option ROM on some PCI, PCI express, etc slot), the BIOS will find the card as part of POST and only then measure the option ROM we find at boot time. Thus the complete PCR value cannot be computed in advance. However, given the new hashes for the BIOS embedded option ROMS some process may dynamically compute what the composite/resultant PCR value will be using a TPM event log, which describes how a PCR value was calculated.

Referring to FIG. 4, a client-server process for implementing a secure update to a computer system is illustrated. At operation 410 a client such as computer system 100 unseals the current key(s) in the PCR registers 128 of the TPM module 124. At operation 415 the client initiates an update to the computer system. For example, the client may initiate an update of the BIOS 126 or other component of the computer system 100. The request may be transferred to the server 220 via the communication network 250.

At operation 425 the update module 222 receives the request and locates the requested update(s) to the computer system. For example, in a situation in which the BIOS 126 of computer system 100 is being updated, the update module 222 may retrieve a copy of the updated BIOS code from a memory module of server 220. At operation 430 the update module 222 determines the expected PCR values for the computer system 100 following the update. In some embodiments this may be performed as described above with reference to FIG. 3. At operation 435 the update(s) and the expected PCR values are transmitted to the client via the communication network 250.

At operation 440 the client receives the update(s) and the expected PCR values. At operation 445 the client seals the encryption keys maintained by the TPM to the expected PCR values received from the server 220.

At operation 450 the update(s) are installed. For example, when the update is a BIOS update, the new BIOS code received with the update may be flashed to the memory module that contains the BIOS 126. When the computer system 100 is rebooted, the PCR values 128 in the TPM 124 correspond to the PCR values that will be calculated based on the updated BIOS. Thus, the TPM will authenticate properly and data encrypted by the computer system 100 may be decrypted by the updated computer system 100.

In alternate embodiments computer updates may be distributed on computer-readable media such as, e.g., a CD-ROM or a flash memory stick. In such embodiments the logic implemented by the update module 222 of server 220 may be encoded as logic instructions on the computer-readable media and may be implemented by the processor 122 of computer system 100, such that the update is managed entirely by computer system 100.

In some situations, some PCR values stored in the TPM may be function of a hardware configuration chosen by an end user of computer system 100. For example the value stored in PCR2 may be a function of one or more additional controllers the user added to the computer system. Thus, the value of PCR2 may not be predictable when the BIOS image is built. Thus, in some embodiments the value for PCR2 and any other unpredictable PCR values, may be calculated at run time when the end user updates the flash.

As noted above, the methods described herein may be embodied as logic instructions on a computer-readable medium. When executed on a processor, the logic instructions cause a general purpose computing device to be programmed as a special-purpose machine that implements the described methods. The processor, when configured by the logic instructions to execute the methods recited herein, constitutes structure for performing the described methods.

Reference in the specification to "one embodiment" or "an embodiment" means that a particular feature, structure, or characteristic described in connection with the embodiment is included in at least an implementation. The appearances of the phrase "in one embodiment" in various places in the specification are not necessarily all referring to the same embodiment.

What is claimed is:

1. A method to update a basic input/output system of a computer system, comprising:
    unsealing at least one current key in a trusted platform module of the computer system;
    initiating an update to the basic input/output system, including communicating an identifier of the basic input/output system to an update module;
    receiving the update from the update module, including obtaining, with the update, an expected value for a platform configuration register in the trusted platform module following the update, wherein the expected value is determined using the identifier;
    sealing at least one key using the expected value for the platform configuration register; and
    installing the basic input/output system update,
    wherein the update module resides on a server, and the computer system comprises a client communicatively coupled to the server via a communication network.

2. The method of claim 1, wherein initiating an update to the basic input/output system comprises at least one of downloading an update to the basic input/output system via a communication network and downloading an update from a computer-readable storage medium.

3. The method of claim 1, wherein obtaining, with the update, an expected value for a platform configuration register in the trusted platform module following the update comprises determining a hash of an existing platform configuration register value and a portion of the basic input/output system.

4. The method of claim 3, further comprising storing the expected value in the platform configuration register.

5. The method of claim 1, wherein sealing the at least one key using the expected value for the platform configuration register comprises encrypting the expected value.

6. The method of claim 1, wherein installing the basic input/output system update comprises flashing a memory module that contains the basic input/output system.

7. The method of claim 1, wherein obtaining, with the update, an expected value for a platform configuration register in the trusted platform module following the update comprises obtaining a hash value for an option ROM associated with a component of the computer system.

8. The method of claim 1, wherein the identifier is communicated to the server from the client via the communication network, and the update is received at the client from the server via the communication network.

9. A computer system, comprising:
    a processor;
    a trusted platform module comprising at least one platform configuration register;
    a basic input/output system; and
    logic to:
        unseal at least one current key in the trusted platform module;

initiate an update to the basic input/output system and communicate an identifier of the basic input/output system to an update module;

receive the update from the update module and obtain, with the update, an expected value for a platform configuration register in the trusted platform module following the update, wherein the expected value is determined using the identifier;

seal at least one key using the expected value for the platform configuration register; and install the basic input/output system update, wherein the update module resides on a server, and the computer system comprises a client communicatively coupled to the server via a communication network.

10. The computer system of claim 9, further comprising logic to update the basic input/output system via at least one of a communication network and from a computer-readable storage medium.

11. The computer system of claim 9, further comprising logic to determine a hash of an existing platform configuration register value and a portion of the basic input/output system.

12. The computer system of claim 11, further comprising logic to store the expected value in the platform configuration register.

13. The computer system of claim 9, further comprising logic to encrypt the expected value.

14. The computer system of claim 9, further comprising logic to flash a memory module that contains the basic input/output system.

15. The computer system of claim 9, wherein the identifier is communicated to the server from the client via the communication network, and the update is received at the client from the server via the communication network.

16. A method to update a computer system, comprising:
initiating an update to a computer system component used to determine encryption parameters for the computer system, including communicating an identifier of the computer system component to an update module;

receiving the update from the update module, including receiving, with the update, an expected security parameter following the update calculated using the computer system component and the identifier; and updating the computer system component with the update, wherein the update module resides on a server, and the computer system comprises a client communicatively coupled to the server via a communication network.

17. The method of claim 16, wherein initiating an update to a computer system component used to determine encryption parameters for the computer system comprises initiating an update to a basic input/output system of the computer system.

18. The method of claim 17, wherein initiating an update to the basic input/output system of the computer system comprises determining a hash of an existing platform configuration register value and a portion of the basic input/output system.

19. The method of claim 16, wherein receiving, with the update, an expected security parameter following the update calculated using the computer system component and the identifier comprises receiving an expected value for a platform configuration register based on the computer system component.

20. The method of claim 16, wherein the identifier is communicated to the server from the client via the communication network, and the update is received at the client from the server via the communication network.

* * * * *